United States Patent
Maiorana

(10) Patent No.: US 10,792,719 B2
(45) Date of Patent: Oct. 6, 2020

(54) FRAMELESS HALF-ROUND TRAILER WITH BUTT JOINTS

(71) Applicant: MAC TRAILER MANUFACTURING, INC., Alliance, OH (US)

(72) Inventor: James A. Maiorana, Hartville, OH (US)

(73) Assignee: Mac Trailer Manufacturing, Inc., Alliance, OH (US)

( * ) Notice: Subject to any disclaimer, the term of this patent is extended or adjusted under 35 U.S.C. 154(b) by 22 days.

(21) Appl. No.: 15/481,699

(22) Filed: Apr. 7, 2017

(65) Prior Publication Data
US 2018/0290579 A1 Oct. 11, 2018

(51) Int. Cl.
| | |
|---|---|
| *B21D 11/20* | (2006.01) |
| *B60P 1/28* | (2006.01) |
| *B62D 33/023* | (2006.01) |
| *B62D 53/06* | (2006.01) |
| *B21D 35/00* | (2006.01) |

(52) U.S. Cl.
CPC .......... *B21D 11/203* (2013.01); *B21D 35/006* (2013.01); *B60P 1/286* (2013.01); *B62D 33/023* (2013.01); *B62D 53/06* (2013.01)

(58) Field of Classification Search
CPC .... B60P 1/045; B60P 1/18; B60P 1/28; B62D 53/08; B62D 53/0821; B62D 35/00; B62D 23/00; B21B 1/38; B21B 17/00; B21B 19/00; B21B 19/12; B21D 5/14; B21D 5/00; B21D 51/20; B21D 11/203

USPC .................. 280/831, 839; 296/183.2
See application file for complete search history.

(56) References Cited

U.S. PATENT DOCUMENTS

| | | | |
|---|---|---|---|
| 1,469,320 A | 10/1923 | Kramer | |
| 2,679,278 A * | 5/1954 | Clark | B21D 51/00 29/281.4 |
| 3,187,425 A * | 6/1965 | Black | B60P 3/221 228/184 |
| 5,454,620 A | 10/1995 | Hill et al. | |
| 5,482,356 A | 1/1996 | Goodson, Jr. | |
| 6,637,808 B1 | 10/2003 | Ling et al. | |
| 8,398,151 B2 * | 3/2013 | Lindstrom | B60P 1/286 296/183.2 |
| 8,550,542 B1 | 10/2013 | Booher et al. | |
| 9,085,331 B1 | 7/2015 | McWilliams | |

(Continued)

FOREIGN PATENT DOCUMENTS

| | | |
|---|---|---|
| CA | 2856260 | 7/2013 |
| DE | 1281866 | 10/1968 |

(Continued)

*Primary Examiner* — Christopher J Besler
*Assistant Examiner* — Christine Bersabal
(74) *Attorney, Agent, or Firm* — Sand, Sebolt & Wernow Co., LPA

(57) ABSTRACT

A frameless dump trailer is provided. The frameless dump trailer includes a forward body portion and a rear body portion. Each body portion is formed from two or more panels joined together with butt-joint welds. The forward portion is first formed by welding planar sections together. After the body portion is formed from the plurality of planar panels, the larger planar portion is rolled in a rolling system to define the arcuate shape of trailer body. Then, the forward and rear body portions are welding together with a transversely extending butt-weld.

14 Claims, 19 Drawing Sheets

(56) References Cited

U.S. PATENT DOCUMENTS

| | | |
|---|---|---|
| 9,315,136 B2 * | 4/2016 | Kibler .................. B60P 1/16 |
| 2002/0124370 A1 | 9/2002 | Deckert et al. |
| 2002/0149254 A1 | 10/2002 | Jensen |
| 2002/0163224 A1 | 11/2002 | Kloepfer |
| 2004/0183334 A1 | 9/2004 | Bibeau |
| 2010/0218700 A1 | 9/2010 | Aaron et al. |
| 2012/0086185 A1 | 4/2012 | Kerr et al. |
| 2016/0355117 A1 | 12/2016 | Wang et al. |
| 2018/0015863 A1 | 1/2018 | Kibler |
| 2018/0022259 A1 | 1/2018 | Zamorano |
| 2019/0263311 A1 | 8/2019 | Robbs |

FOREIGN PATENT DOCUMENTS

| | | |
|---|---|---|
| EP | 1319584 | 6/2003 |
| FR | 2732052 | 9/1996 |
| FR | 2928633 | 9/2009 |
| WO | 2018130967 | 7/2018 |

* cited by examiner

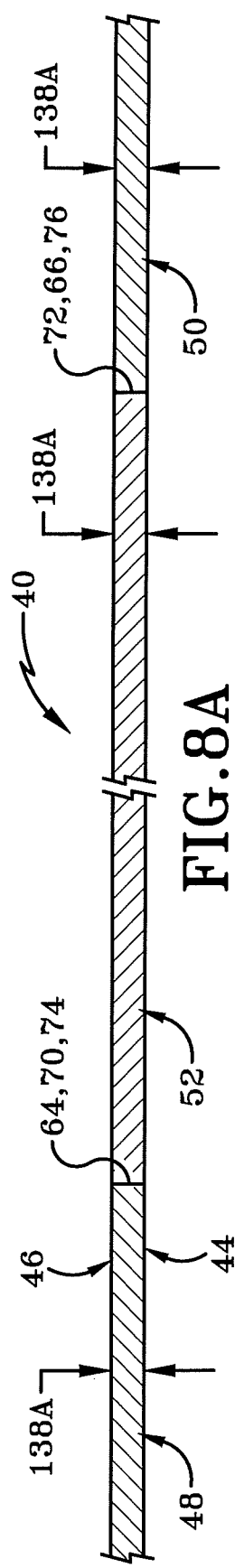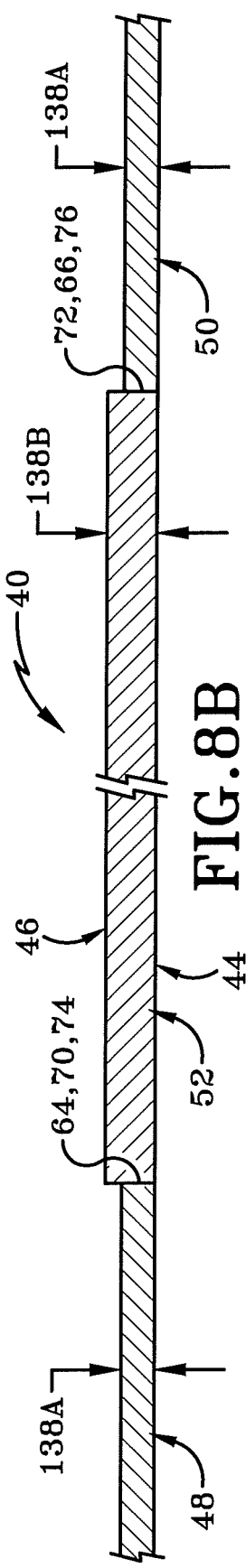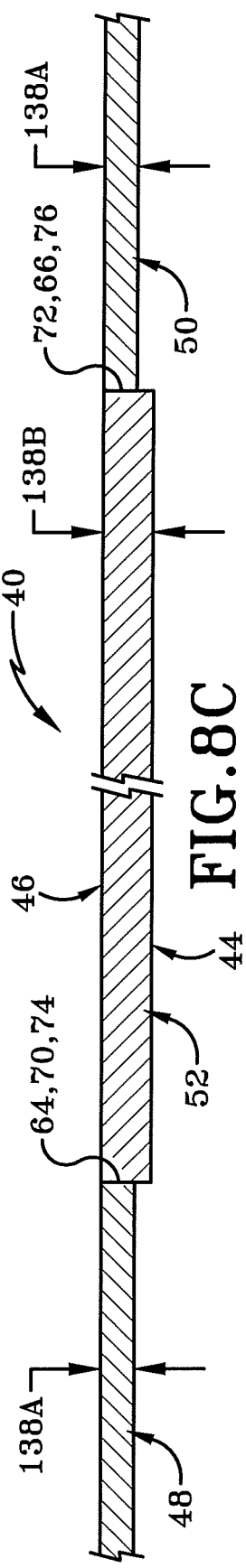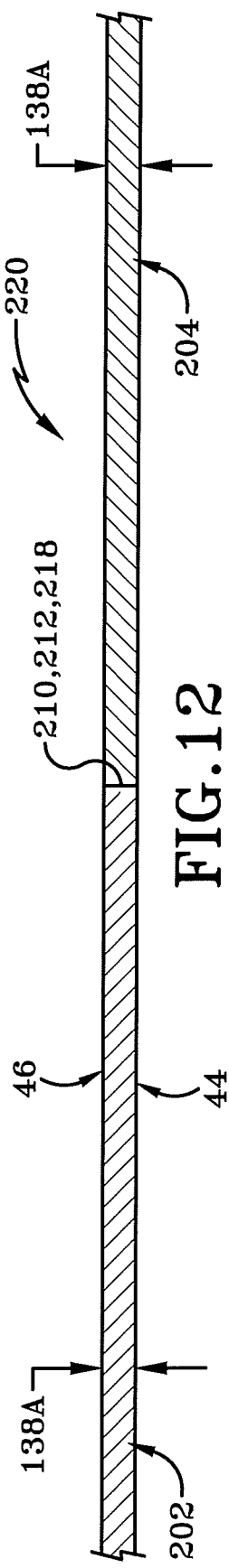

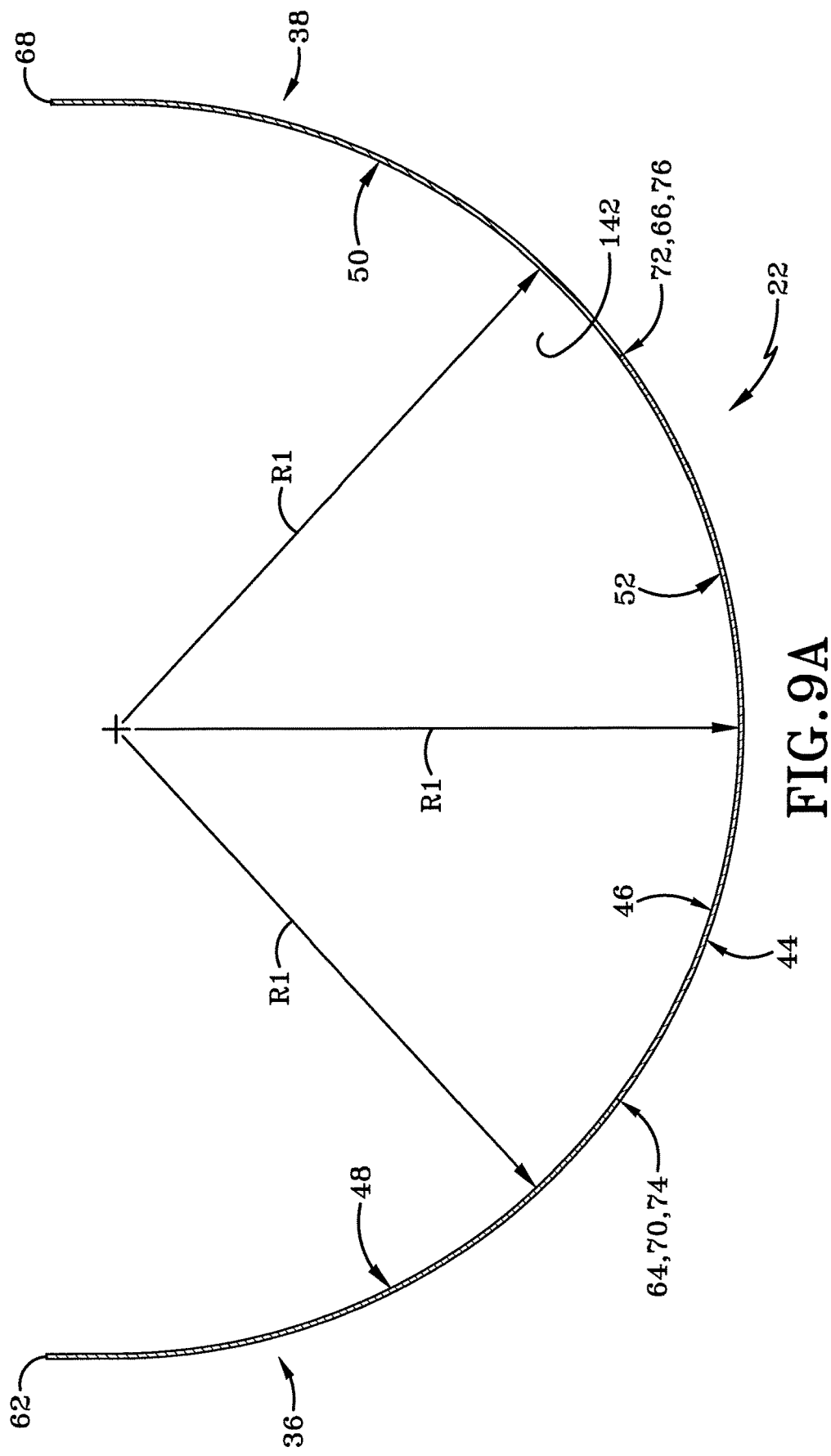

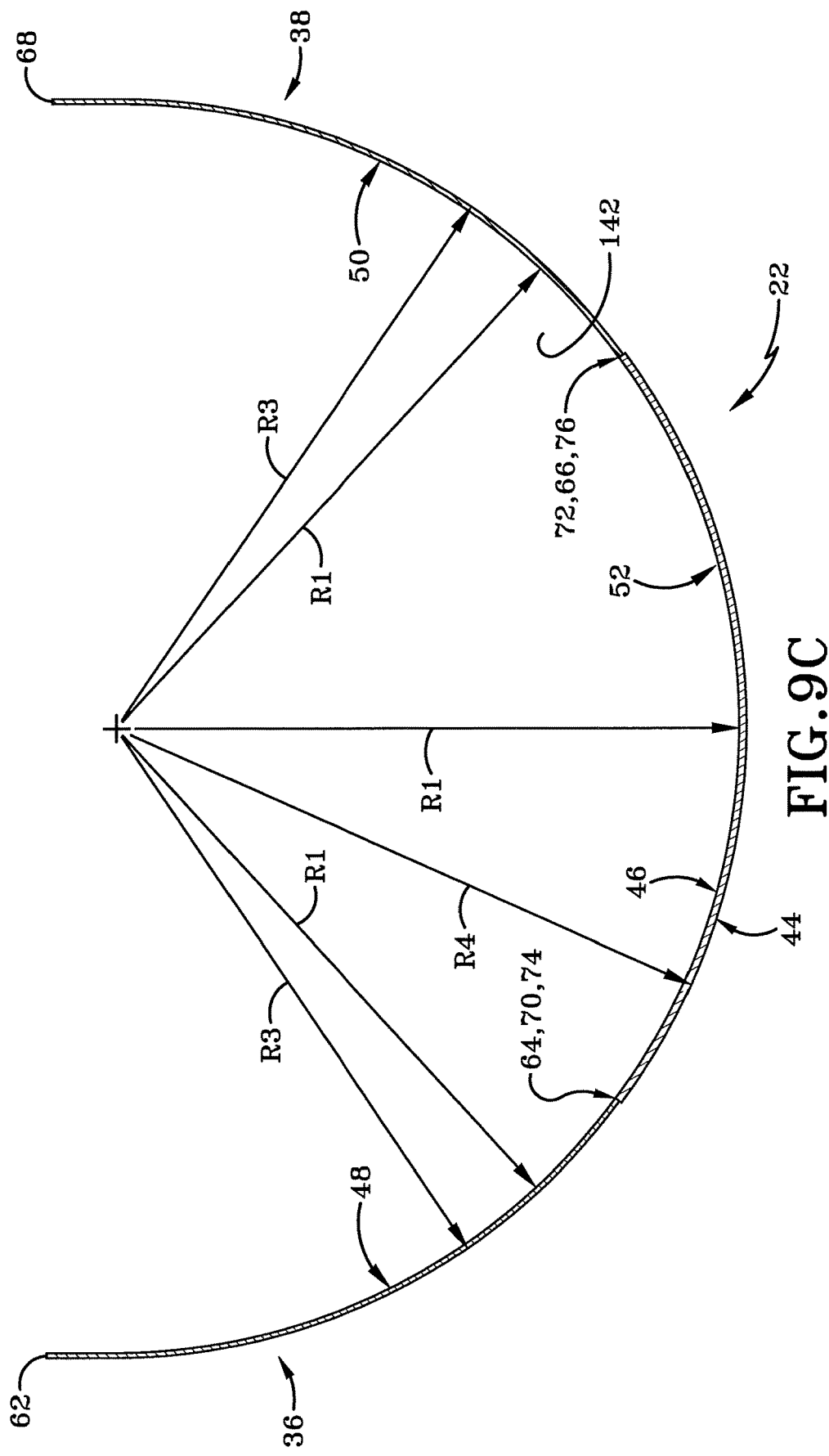

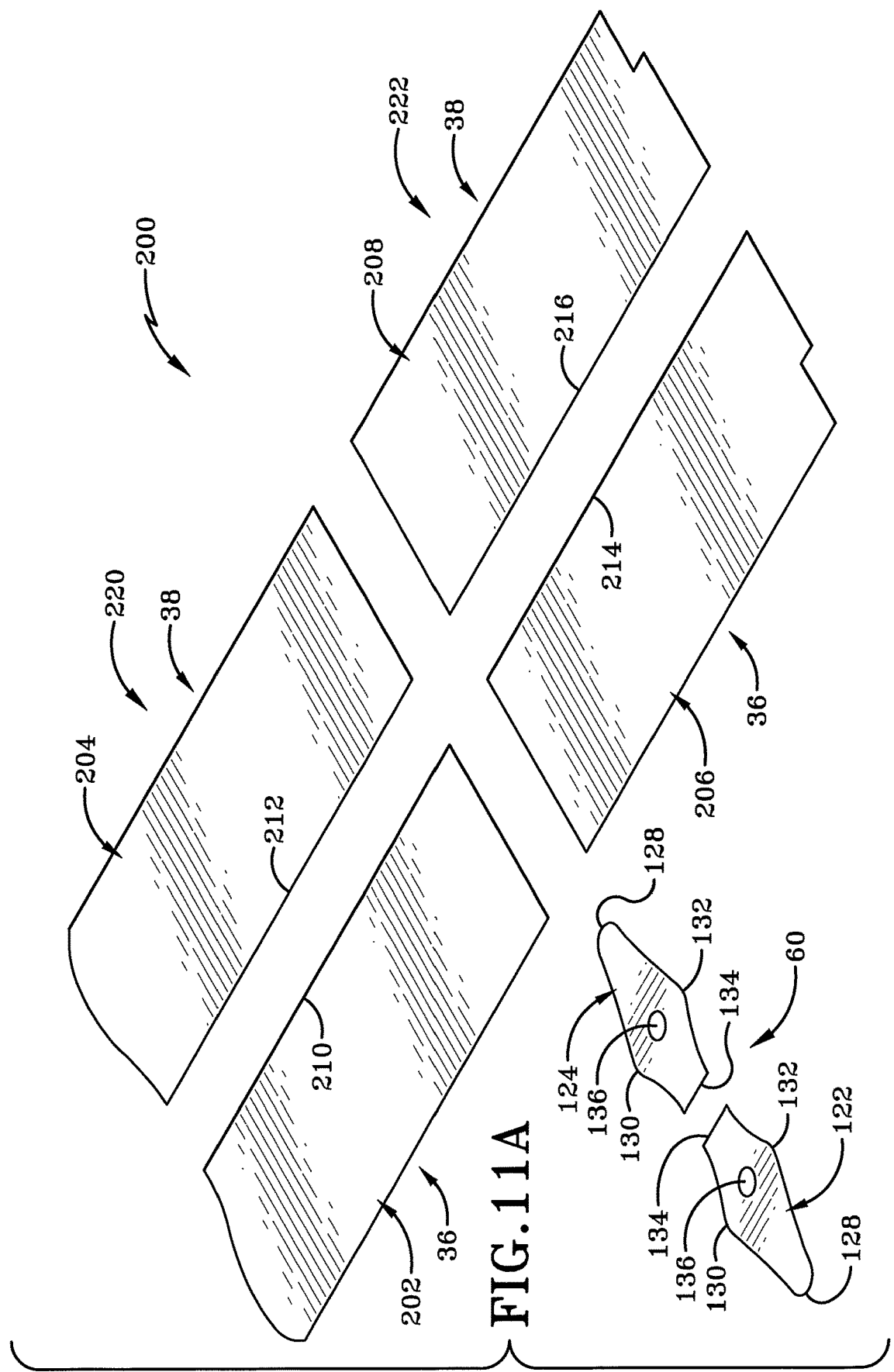

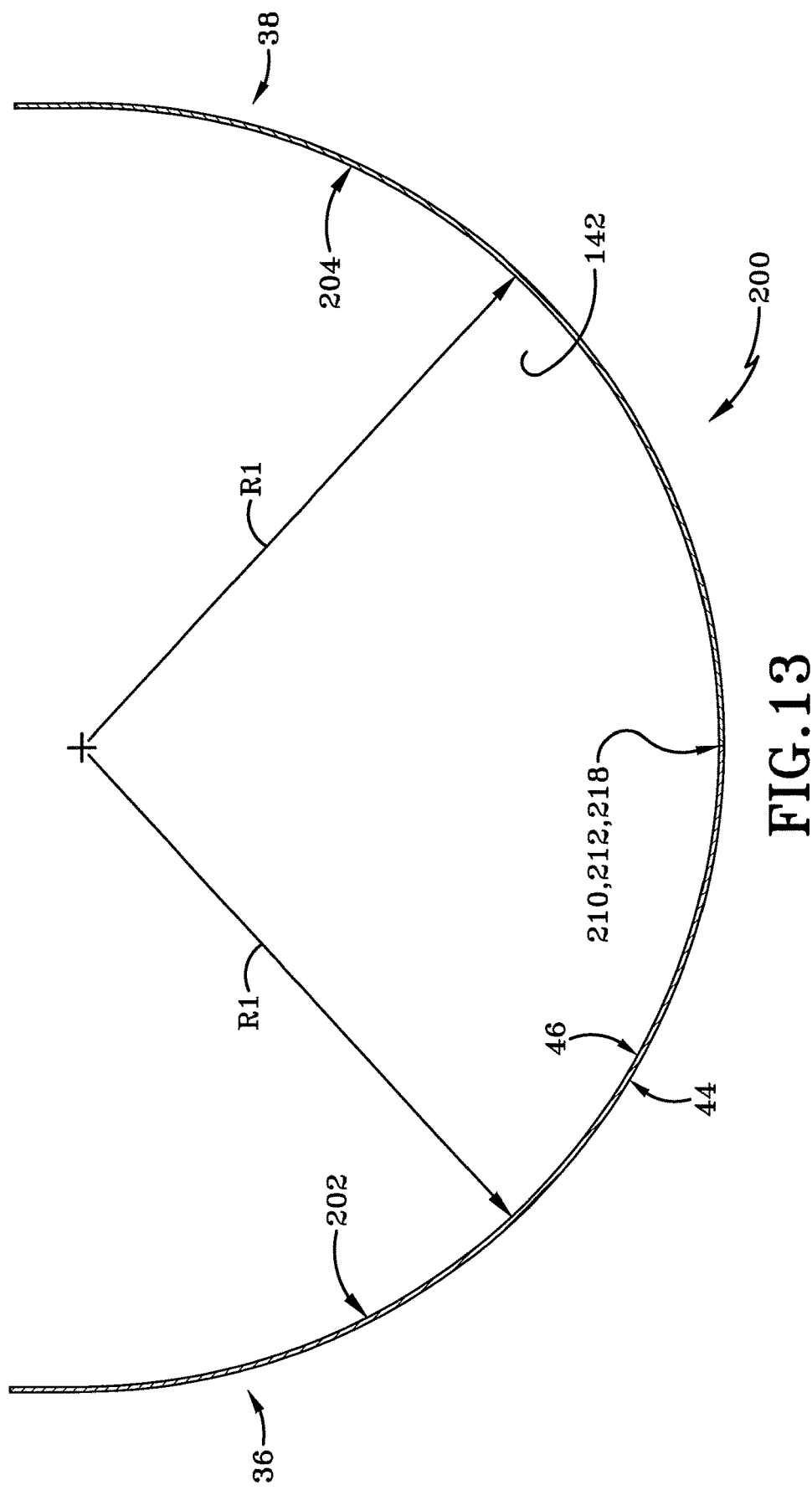

FRAMELESS HALF-ROUND TRAILER WITH BUTT JOINTS

BACKGROUND

Technical Field

The present disclosure relates generally to frameless dump trailers. More particularly, the present disclosure relates to a frameless dump trailer formed from planar sections butt welded together.

Background Information

Frameless dump trailers are known to carry bulk materials when towed by a towing vehicle. Typically, the frameless dump trailers include a lifting system (often hydraulically operated) to tilt/raise the trailer in order the dump the bulk materials carried thereby.

A trailer body on the conventional frameless dump trailer is fabricated from metallic sections of arcuate panels welded together at overlapping lap joints. Lap joints are utilized because the panel sections are rolled prior to connecting them together. When the arcuate panels are joined together, the inner surface and the outer surface of the trailer body is not flush across the lap joint union. Rather, a step-wise relationship is formed in both the outer surface and the inner surface.

SUMMARY

Issues continue to exist with current frameless trailers and their method of assembly. Namely, it is desirable to provide a flush alignment of surfaces across joined panels that collectively form the trailer body. The present disclosure addresses these and other issues.

In one aspect, an embodiment of the present disclosure may provide a frameless dump trailer comprising: a forward end spaced from a rear end defining a longitudinal direction there between, and a first side opposite a second side defining a transverse direction there between; a forward trailer body portion defining the forward end and a rear trailer body portion defining the rear end; and wherein the forward trailer body portion is formed from a plurality of forward planar panels butt welded together side-by-side at forward longitudinal unions and then rolled into an arcuate configuration.

In another aspect, an embodiment of the present disclosure may provide a half-round dump trailer comprising: a forward end spaced apart from a rear end defining a longitudinal direction therebetween, a first side opposite a second side defining a transverse direction therebetween; a trailer body formed from a plurality of arcuate plates welded together at butt seams collectively defining an outwardly and downwardly facing convex outer surface on the trailer body and defining an inwardly and upwardly facing concave inner surface on the trailer body adapted to retain bulk materials; a longitudinally extending bottom butt welded seam between transversely adjoining arcuate plates, wherein the bottom butt welded seam extends from the forward end to the rear end and defines the lowermost portion of the concave inner surface on the trailer body; and a trolley supporting the trailer body from below adjacent the rear end.

In another aspect, an embodiment of the present disclosure may provide a method of forming a frameless dump trailer comprising the steps of: providing a first planar plate and a second planar plate; abutting the first and second planar plates and aligning flushly at least one surface surfaces on the first and second planar plates; welding the first and second planar plates at a first butt weld to establish a larger planar trailer body portion; and after welding the first and second planar plates together with the first butt weld, then rolling the larger planar first trailer body portion to establish an arcuate body portion.

In another aspect, an embodiment of the present disclosure may provide a frameless dump trailer. The frameless dump trailer includes a forward body portion and a rear body portion. Each body portion is formed from two or more panels joined together with butt joint welds. The forward portion is first formed by welding planar sections together. After the body portion is formed from the plurality of planar panels, the larger planar portion is rolled in a rolling system to define the arcuate shape of trailer body. Then, the forward and rear body portions are welded together with a transversely extending butt weld.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 8A is a cross section view taken along line 8A-8A in FIG. 7A depicted a uniform thickness across the panels such that the inner and outer surfaces of the trailer body are flush;

FIG. 8B is a cross section view similar to FIG. 8A but depicting a thicker intermediate panel to define a step-wise profile of the inner surface and a flush outer surface;

FIG. 8C is a cross section view similar to FIG. 8A but depicting a thicker intermediate panel to define a step-wise profile of the outer surface and flush inner surface;

FIG. 9A is a cross section view taken along line 9A-9A in FIG. 7C depicting a uniform radius of curvature after the planar forward portion has been rolled;

FIG. 9C is a cross section view similar to FIG. 9A depicting a non-uniform radius of curvature of the thicker panel depicted in FIG. 9C;

FIG. 11A is a perspective view of the trailer body of the second embodiment detailing a partially formed trailer body wherein the planar panels are joined together prior to being rolled into an arcuate profile;

FIG. 12 is a cross section view of the second embodiment taken along line 12-12 in FIG. 11B;

FIG. 13 is a cross section view of the second embodiment taken along line 13-13 in FIG. 11C;

Similar numbers refer to similar parts throughout the drawings.

DETAILED DESCRIPTION

Figure 1:
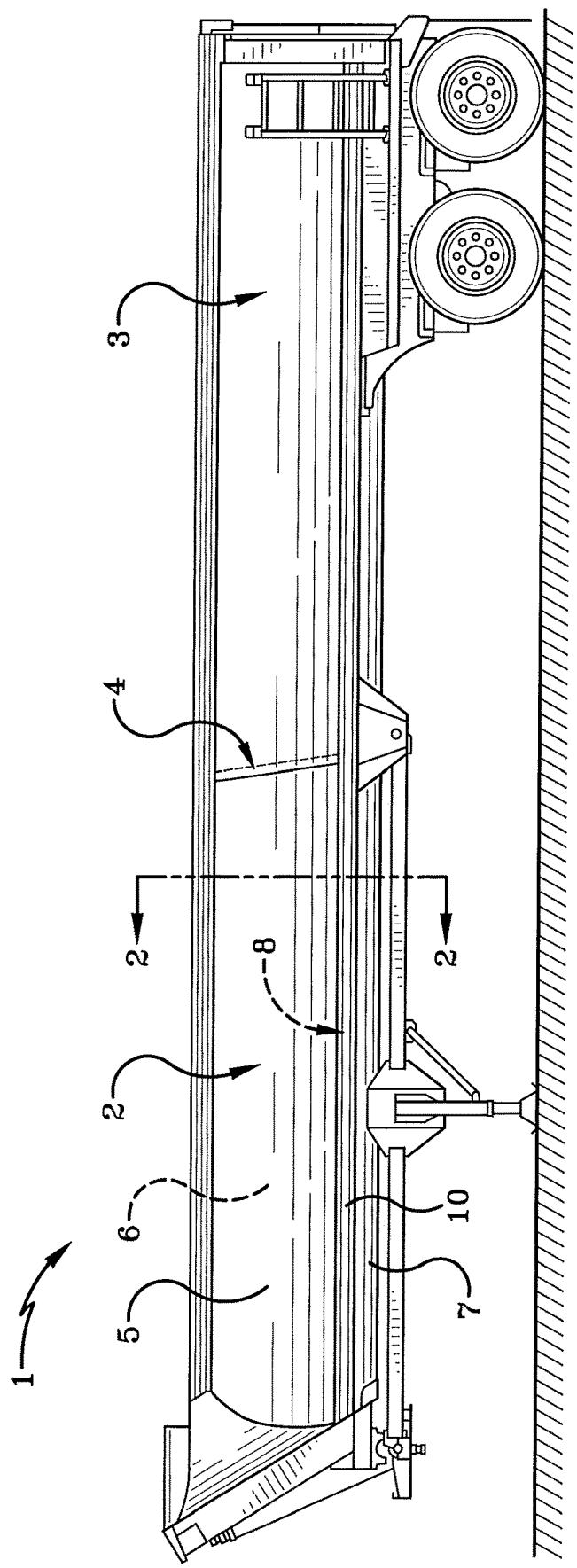
FIG. 1 is a side elevation view of a PRIOR ART frameless dump trailer.
Figure 2:
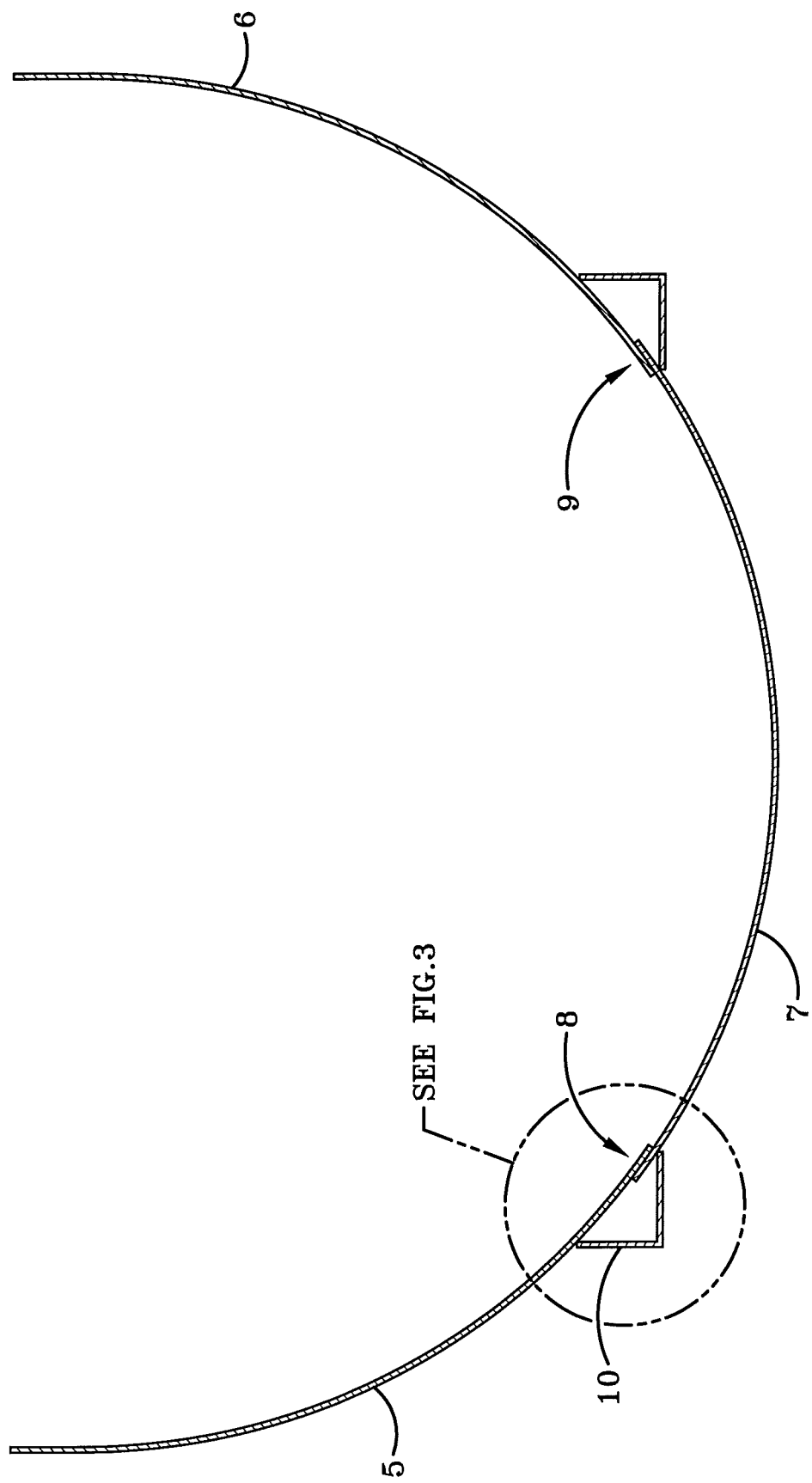
FIG. 2 is a cross section view of the PRIOR ART frameless dump trailer taken along line 2-2 in FIG. 1.
Figure 3:
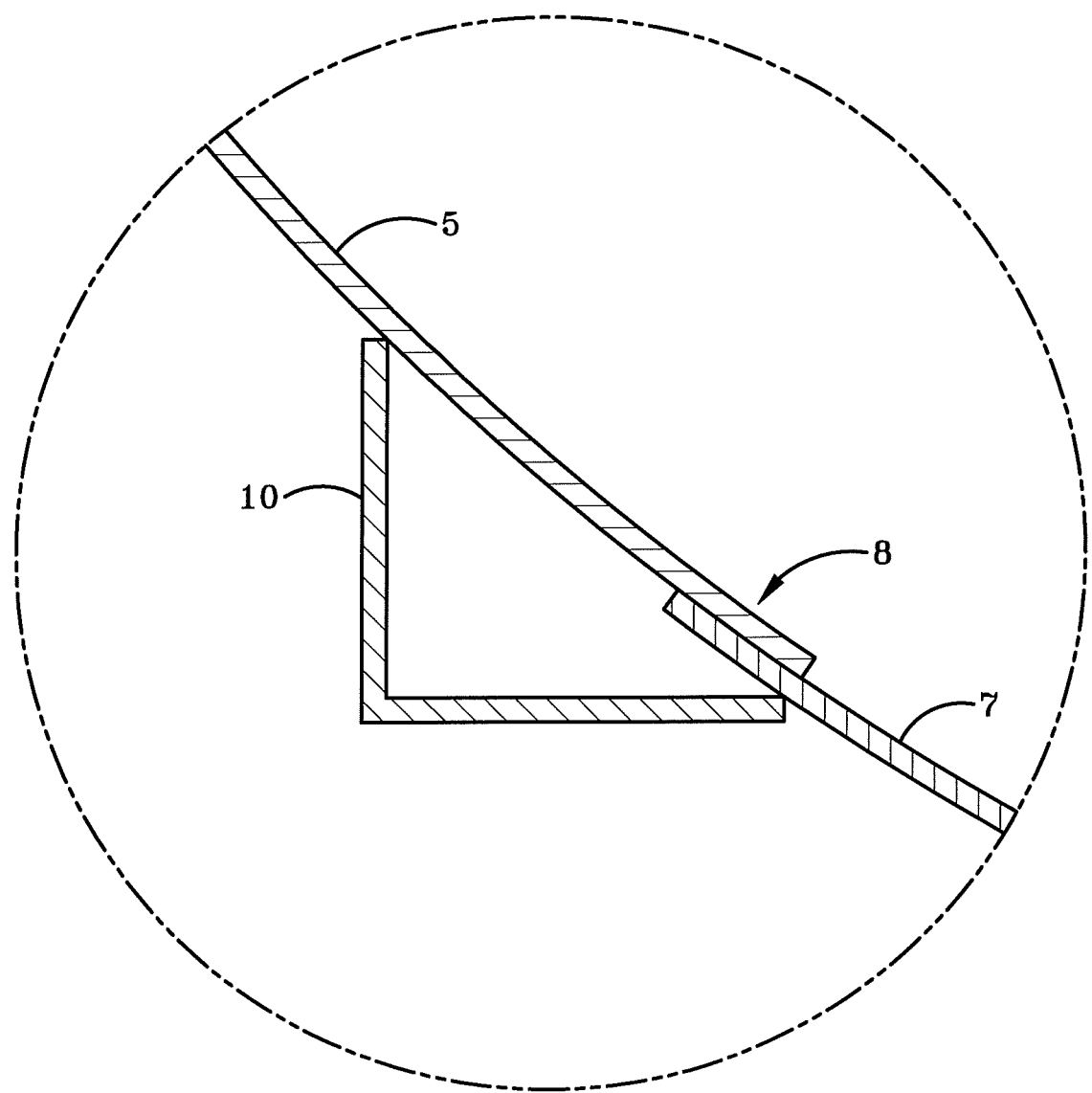
FIG. 3 is an enlarged cross section view of the PRIOR ART frameless dump trailer detailing the region labeled "SEE FIG. 3" in FIG. 2.

As depicted in FIG. 1 through FIG. 3, a prior art conventional half-round frameless dump trailer is generally indicated at 1. The conventional frameless dump trailer 1 includes a forward portion 2 and a rear portion 3. The forward portion 2 is welded to the rear portion 3 at an overlapping lap joint 4 located approximately near the longitudinal middle of trailer 1.

As depicted in FIG. 2, the conventional half-round frameless trailer forward portion 2 includes a plurality of arcuate panel segments welded together at overlapping lap joints. Particularly, a first arcuate panel 5 is associated with the left side of the conventional trailer 1, a second arcuate panel 6 is associated with the right side of the conventional trailer 1, and an intermediate third arcuate panel 7 is intermediate the first panel 5 and the second panel 6. The first panel 5 is connected to the third panel 7 at a first overlapping lap joint 8 and the second arcuate panel 6 is connected the intermediate third panel 7 at a second overlapping lap joint 9.

As depicted in FIG. 2 and FIG. 3, an angle iron support member 10 may extend longitudinally along the outside of the trailer 1 and may be welded to the outer surface of the respective first and third panels 5 and 7. A similar angle iron support member 10 may be positioned on the exterior surfaces of trailer 1 exterior to second lap joint 9.

With continued reference to FIG. 3, the assembled conventional trailer 1 includes a slight step down formed by the overlapping arcuate panels at lap joint 8, such that the inner surfaces of the convexly arcuate inner surfaces of adjoined panels 5, 7 are not flush once fully assembled. This is formed when the panels are rolled to give their arcuate shape. Namely, each individual panel, such as first panel 5, is first rolled in a rolling apparatus as one having ordinary skill in the art would understand. Then, another panel, such as third panel 7, is rolled in a rolling apparatus. Then, the arcuately formed panels are welded together. Because the curved panels are already arcuate, the lap joint 8 is formed by overlapping the first and third panels relative to each other. The lap joint is easy to align and can be easily welded with the segments already in the bent position. After welding the lap joint 8, the exterior supportive member 10 may be welded to the outside to thereby attach its angle iron, or L-shaped cross section, to both the third panel 7 and the first panel 5.

Figure 4:
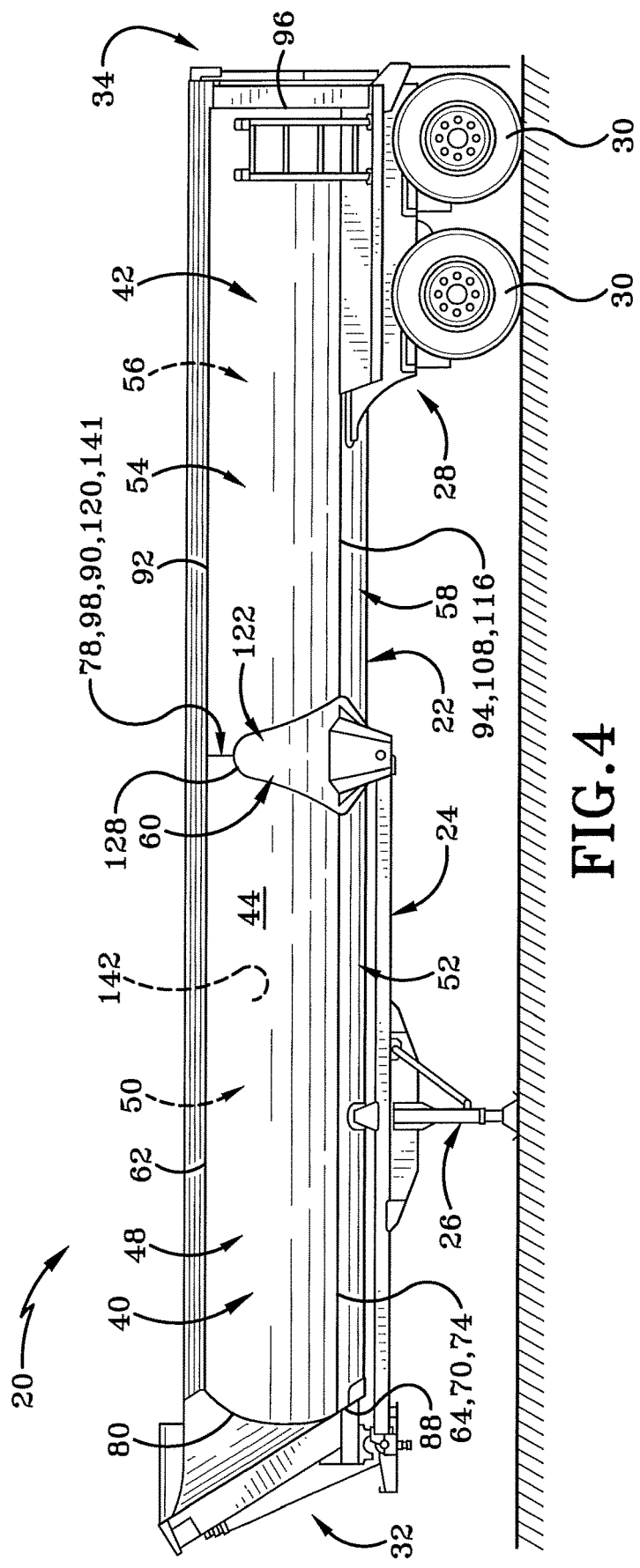
FIG. 4 is a side elevation view of a frameless dump trailer in accordance with a first embodiment of the present disclosure.

As depicted in FIG. 4, a half-round frameless dump trailer in accordance with the present disclosure is depicted generally at 20. The half-round frameless dump trailer 20 includes a trailer body 22, a lift arm 24 including landing gear 26, and a trolley assembly 28 including ground engaging wheels 30.

Trailer 20 further includes a forward end 32 and opposite a rear end 34 defining a longitudinal direction therebetween. Further, a first side 36 (FIG. 7C) is opposite a second side 38 (FIG. 7C) defining a transverse direction therebetween. The transverse direction is generally orthogonal to the longitudinal direction.

The trailer body 22 includes a forward portion 40 and a rear portion 42. Forward portion 40 is associated with the forward end 32 of the trailer and the rear portion 42 is associated with the rear end 34 of the trailer 20. The trailer body 22 includes a convex outer surface 44 spaced opposite a concave inner surface 46 (FIG. 7C) defining a containing volume therein. The containing volume stores bulk materials or other items hauled by trailer 20.

Figure 5:
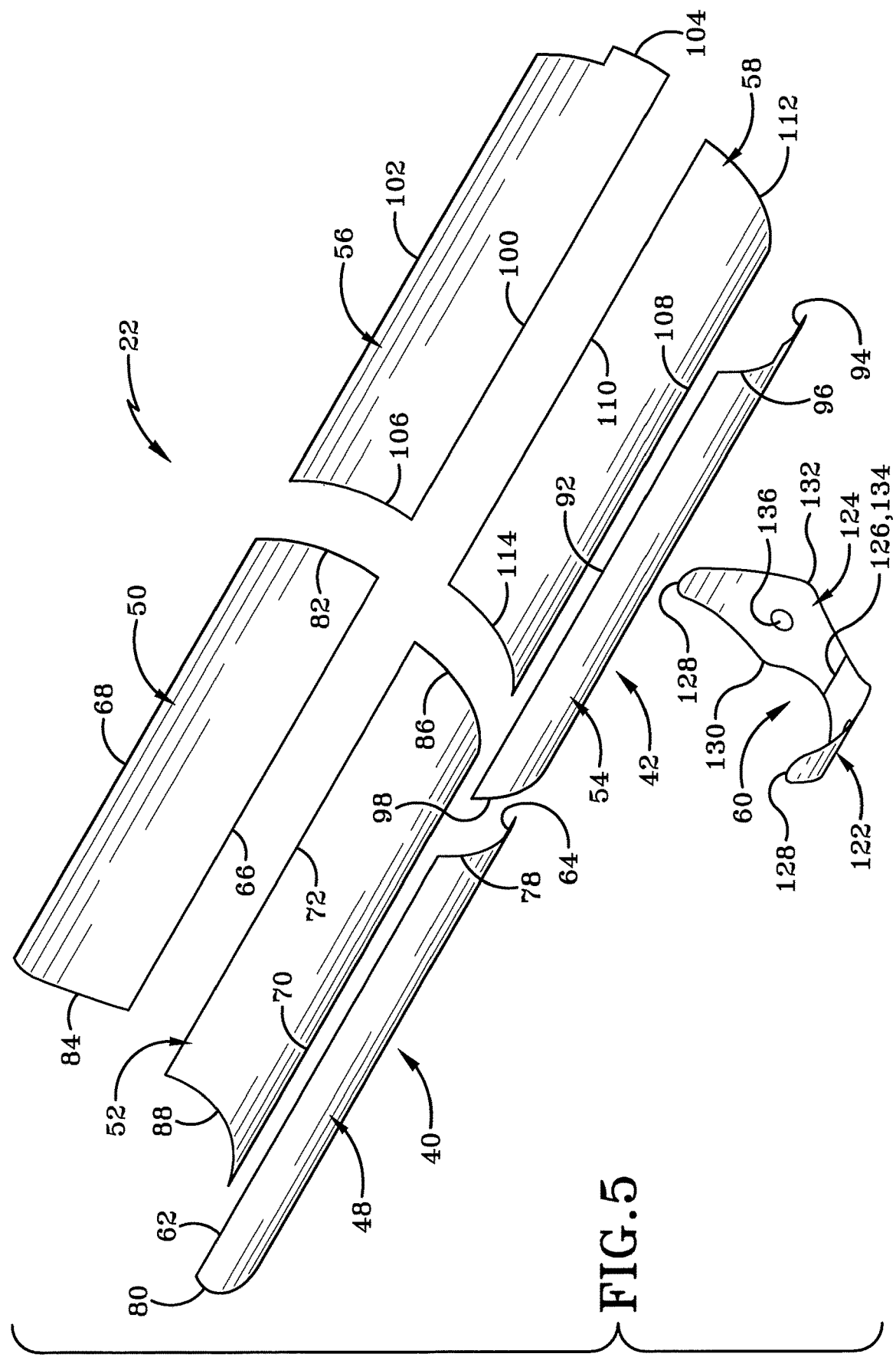
FIG. 5 is an exploded perspective view of a trailer body of the first embodiment detailing curved panels.

FIG. 5 depicts an exploded perspective view of the trailer body 22. The trailer body 22 includes a forward first panel section 48, a forward second panel section 50, a forward third panel section 52, a rear fourth panel section 54, a rear fifth panel section 56, and a rear sixth panel section 58. Additionally, the trailer body 22 may include a supportive bracing member 60.

Figure 6:
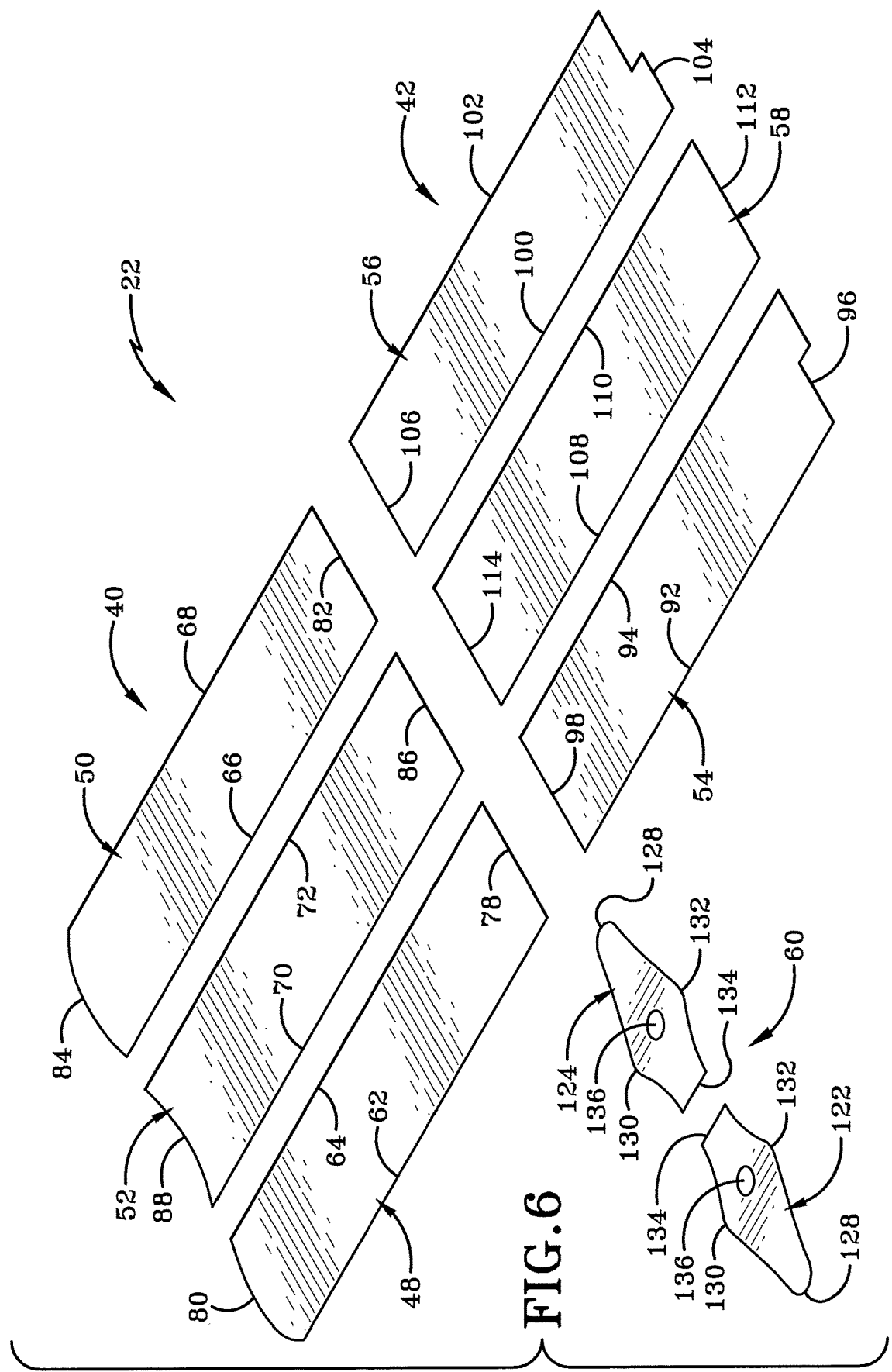
FIG. 6 is an exploded perspective view of the trailer body of the first embodiment detailing planar panels.
Figure 7A:
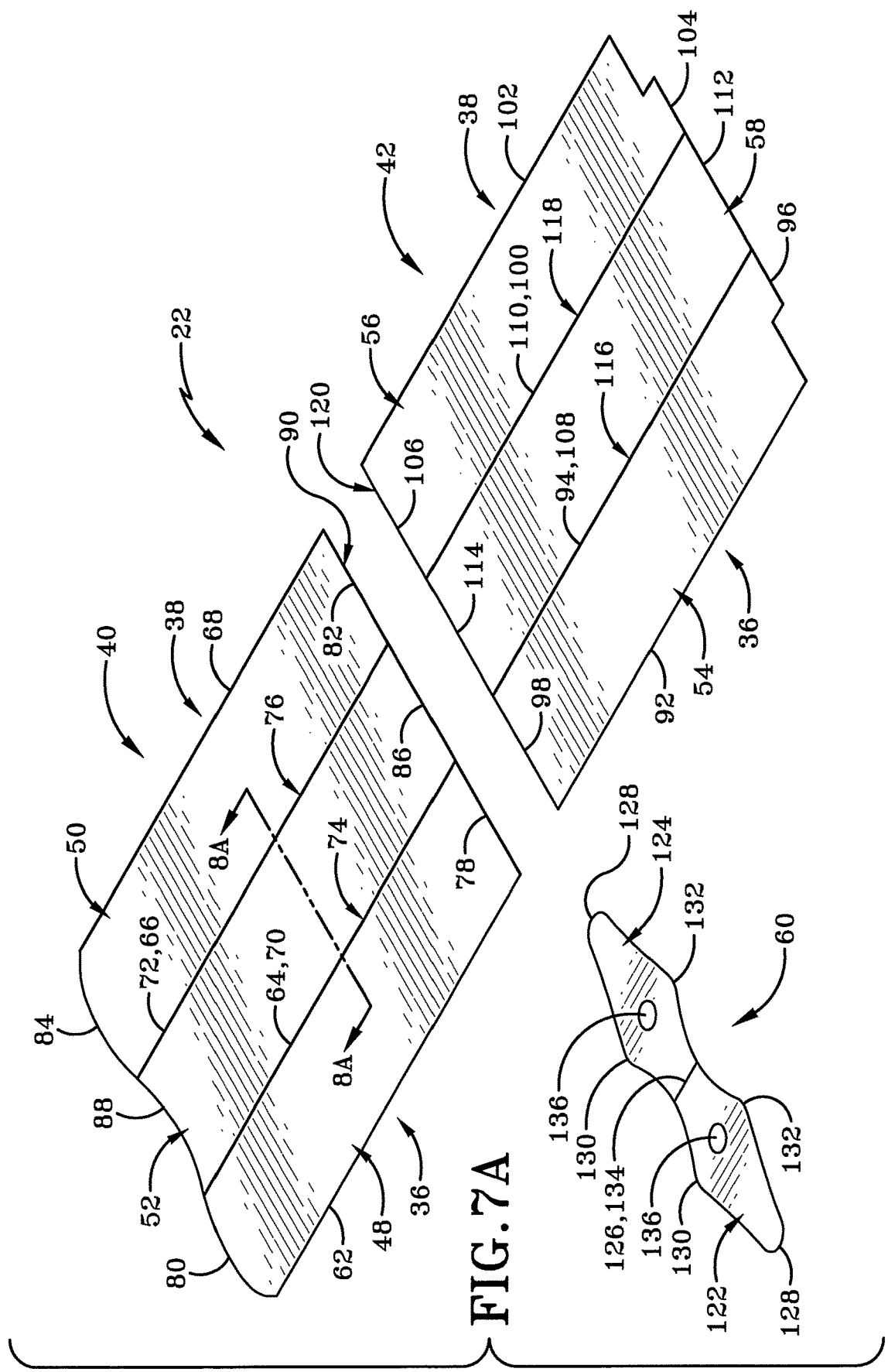
FIG. 7A is a perspective view of the trailer body of the first embodiment detailing a partially formed trailer body wherein the planar panels are joined together prior to being rolled into an arcuate profile.

As depicted in FIG. 6 and FIG. 7A, the panel sections are planar flat members formed from metal sheets prior to being rolled into their arcuate shape shown exploded in FIG. 5. The forward first panel section 48 includes a longitudinal first edge 62 and a longitudinal second edge 64. The forward second panel section 50 includes a longitudinal first edge 66 and a longitudinal second edge 68. The forward third panel section 52 includes a longitudinal first edge 70 and a longitudinal second edge 72.

As shown in FIG. 7A, forward portion 40 is formed planarly when the forward third panel section 52 is welded intermediate the first panel section 48 associated with first side 36 and the second panel section associated with second side 38. A first union 74 is defined between the abutment of forward first panel section 48 and forward third panel section 52. A second union 76 is defined between the abutment of forward second panel section 50 and forward third panel section 52. When the forward portion 40 is laid flat as depicted in FIG. 7A, the first union 74 and second union 76 are offset and spaced apart parallel relatively to each other and are oriented longitudinally extending from a forward end towards the rear end.

With continued reference to FIG. 6, each of the forward panel sections includes a trailing edge positioned rearwardly from a leading edge. Particularly, forward first panel section 48 includes a trailing edge 78 and a leading edge 80. The forward second panel section 50 includes a trailing edge 82 and a leading edge 84. The forward third panel section 52 includes a trailing edge 86 and a leading edge 88. When the forward panel sections 48, 50, and 52 are aligned longitudinally side by side and welded together, the respective trailing edges 78, 82, and 86 are flushly aligned along a common transverse plane as indicated in FIG. 7A. A common trailing edge 90 (FIG. 7A) of the forward portion 40 of trailer body 22 is defined collectively from the abuttingly aligned trailing edges 78, 82, and 86.

With continued reference to FIG. 6, the rear fourth panel section 54 includes a first side edge 92, a second side edge 94, a trailing edge 96, and a leading edge 98. The rear fifth panel section 56 includes a first side edge 100, a second side edge 102, a trailing edge 104, and a leading edge 106. The rear sixth panel section 58 includes a first side edge 108, a second side edge 110, a trailing edge 112, and a leading edge 114. The rear fourth panel section 54 is positioned and associated with the first side 36 and the rear fifth panel section 56 is positioned and associated with second side 38. Thus, the rear sixth panel section 58 is positioned intermediate the fourth and fifth panel sections respectively. The rear panel sections 54, 56, and 58 are longitudinally aligned to form a third longitudinally extending union 116 and a fourth longitudinally extending union 118. The third union 116 is defined between the longitudinal abutment between second side edge 94 on the rear fourth panel section 54 and the first side edge 108 on the rear sixth panel section 58. The fourth union 118 is defined between the longitudinal abutment of second side edge 110 on the rear sixth panel section 58 and the first side edge 100 on the rear fifth panel section 56. Collectively, the rear fourth panel section 54, the rear fifth panel section 56, and the rear sixth panel section 58 define the rear portion 42 of trailer body 22.

With continued reference to FIG. 7A, the leading edges of the rear panel sections are aligned flushly along a common plane to define a common leading edge 120. As will described in greater detail below, when the trailer body 22 is fully assembled, the common leading edge 120 on the rear portion 42 is abuttingly aligned with the common trailing edge 90 on forward portion 40 along a common transverse plane preferably perpendicular to the unions 74, 76, 116, and 118. Additionally, when the common trailing edge 90 is abuttingly aligned with the common leading edge 120, the first union 74 is longitudinally coplanar with the third union 116 and the second union 76 is longitudinally coplanar with the fourth union 118.

With continued reference to the unions 74, 76, 116, and 118, in accordance with respect to the present disclosure, each of these unions is a butt joint formed from two adjoining plates abutted together and welded in place. The respective butt joints are formed by fabricating the trailer body in planar sections and welding them together to create larger planar panels. As will be described greater detail below, after the butt joint unions have been formed, the collective planar panel is then rolled to give the trailer body its arcuate shape. This is in stark contrast to the conventional half-round dump trailer 1 (FIG. 1; Prior Art) which is fabricated by first rolling its panel sections and then welding them together which requires welded lap joints of overlapping sections of material. The butt joints formed from the unions in the present disclosure provide advantages over lap joints of conventional trailers in that the butt joint unions are easier to assemble, may be stronger in some instances, and can provide a more aesthetic appearance due to the smooth and flush alignment of the respective inner and outer surfaces across the union. This is distinct from conventional trailers because overlapping joints do not provide flushly aligned surfaces. Furthermore, overlapping lap joints may be compromised (i.e. weakened) in strength at the points where the overlap portion ends.

With continued reference to FIG. 6, the supportive brace member 60 is formed from first support member 122 and a second support member 124. First and second support members 122, 124 are structurally identical and mirrored about a longitudinal plane defined by a union 126 connecting the first support member 122 to the second support member 124. The first support member 122 is initially formed as a substantially planar sheet of metal including a first side end 128 that extends arcuately between curved edges extending outwardly to a leading arcuate apex edge 130 and a trailing arcuate apex edge 132. The edges curve taperedly inwardly towards longitudinally aligned medial edge 134 which is adapted to connect with an identical medial edge on second support member 124. Support member 122 defines a vertically aligned rounded aperture 136 therethrough. Similar reference numerals are used for corresponding features on the second support member 124. In one particularly embodiment, support member 60 forms entirely arcuate edges when the first and second support member 122, 124 are butt-welded together. Stated otherwise, the arcuate support brace or member 60 does not have any linear outermost edges when the first and second support members 122, 124 are connected together.

As depicted in FIG. 7A, support member 60 is first formed by aligning the medial edges 134 of the first support member 122 and the second support member 124. The aligned medial edges 134 are positioned in an abutting relationship to form a butt joint and are welded together to create union 126. Supportive brace member 60 identified in FIG. 7A is substantially planar prior to being formed in an arcuate manner as identified in FIG. 5.

As depicted in FIG. 8A, forward portion 40 of trailer body 22 has at least one planar surface formed from the flush alignment of the forward first panel section 48, the forward second panel section 50, and the third forward panel section 52. The embodiment depicted in FIG. 8A identifies that outer surface 44 of trailer body 22 is substantially flat and additionally the inner surface 46 of trailer body 22 is substantially flat as well. Recall, FIG. 8A depicts the welded sections 48, 50, and 52 planar arrangement prior to being rolled to give trailer body 22 its arcuate profile, which will be described in greater detail hereinafter.

FIG. 8B and FIG. 8C detail alternative embodiments of the present disclosure that wherein only one surface of forward portion 40 of trailer body 22 is substantially flat and coplanar prior to being rolled and formed into its arcuate profile. Namely, FIG. 8B depicts the exterior surface 44 substantially flat and planar and the inner surface 46 has a step-wise profile due to increased thickness of the forward third panel section 52. The increased thickness of third section 52 relative to the exterior surface of first and second sections 48, 50 provides a strengthening function for the center of the assembled trailer body 22. This is beneficial as the trailer body 22 is configured to haul bulk materials and the intermediate third panel section 52 is positioned at the bottom of the assembled trailer body 22 which supports a majority of the bulk material weight being hauled by trailer 20. FIG. 8C depicts a scenario where prior to being rolled into its arcuate formation, the inner surface 46 is substantially flat and coplanar and the exterior surface 44 has a step-wise profile formed from the greater thickness of the forward third panel section 52. The uniform thickness of the forward panel sections in FIG. 8A is identified as dimension 138A. For the embodiments detailed in FIG. 8B and FIG. 8C, the increased thickness of the third panel section 52 is identified as dimension 138B.

Reference is now made to the manufacture of trailer body 22 with respect to the welding and rolling process to give the trailer body 22 having butt joints in its arcuate profile. As indicated in FIG. 6, the panel sections 48, 50, 52, 54, 56, and 58 are aligned in a manner such that the forward panel sections 48, 50, and 52 are positioned longitudinally forward from the rear panel sections 54, 56, and 58. The second panel section 50 is aligned intermediate the first and second panel sections 48, 50. The forward panel sections are welded together to create forward portion 40. The welds defining the first union 74 and the second union 76 are butt joints having no overlap. Initially, the forward portion 40 is a planar sheet of metal before it is rolled.

Figure 14A:
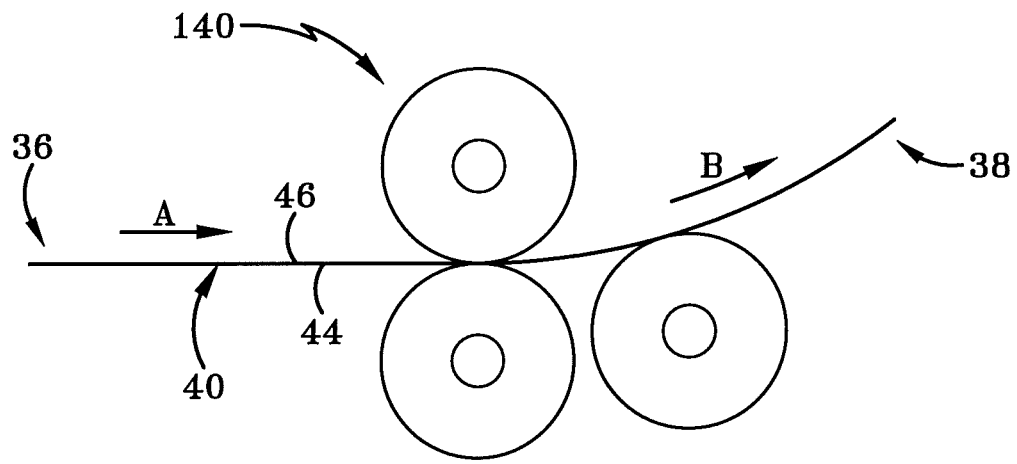
FIG. 14A is a diagrammatic view of a rolling system in operation for rolling the larger planar portions of the trailer body.
Figure 14B:
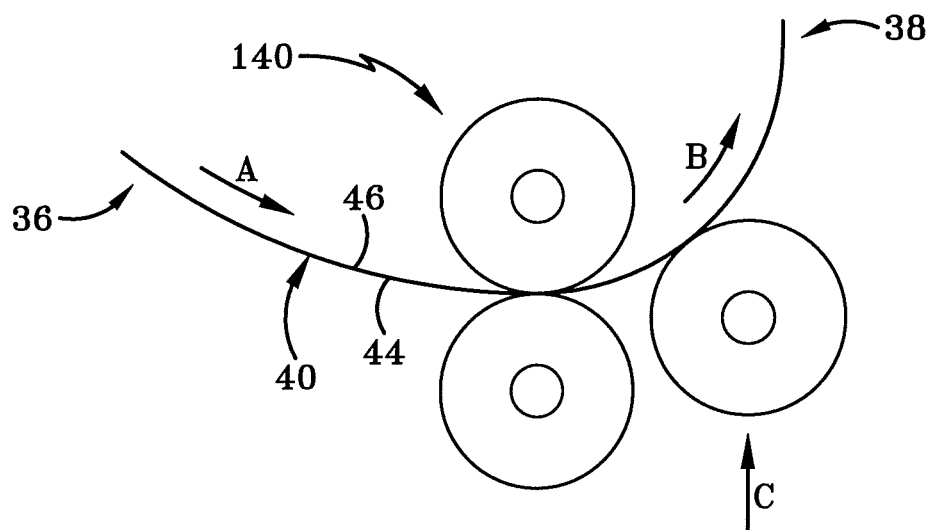
FIG. 14B is a diagrammatic view of the rolling system in operation for rolling the larger planar portions of the trailer body.
Figure 14C:
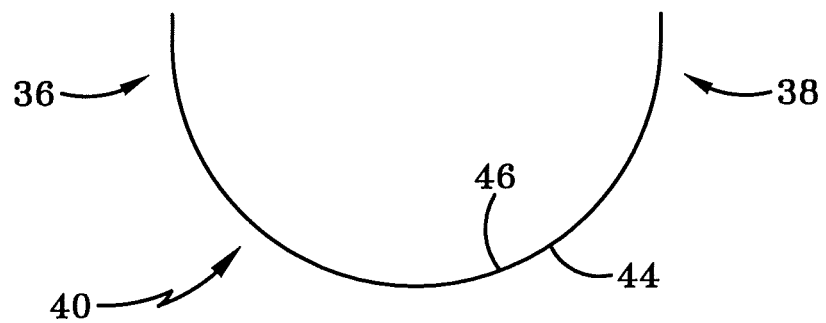
FIG. 14C is a diagrammatic view of the arcuate body profile imparted to the welding panels by the rolling system.

FIG. 14A through FIG. 14C details the rolling process to create the arcuate profile of the forward portion 40 and the rear portion 42 of trailer body 22. Description hereinafter is made with reference to forward portion 40. However, it is to be understood that the rear portion 42 is formed in a similar manner. Forward portion 40 is fed transversely through a rolling machine, or rolling assembly 140. Rolling assembly 140 may include a set of pinch rollers and a bend roller which are detailed in diagrammatic form and are not intended to be limiting as one having ordinary skill in the art would understand. The planar portion 40 is fed between the pinch rollers in the transverse direction moving along in the direction of arrow A. As planar forward portion 40 moves through the rolling assembly 140, a bend roller may bend the forward portion 40 in the arcuate direction of arrow B. As indicated in FIG. 14B, some implementations may include a bend roller movable in the vertical direction as indicated by arrow C to further establish the arcuate profile of forward portion 40 as indicated in FIG. 14C.

In accordance with an aspect of the present disclosure, the sequential formation of trailer body 22 may be critical in some implementations. Namely, the butt joints defining the first union 74 and the second union 76 on forward portion 40 are welded prior to being rolled in rolling assembly 140. This is in contradistinction to a conventional half-round dump trailer manufacturing method. Recall that the conventional manufacturing method first requires for the planar sheets of material to be rolled then welds the arcuate sections together using overlapping lap joints and reinforcing them with a supportive member angle iron extending longitudinally along the length of the conventional trailer.

The butt joint formation method identified hereinabove enables the outer surface 44 and the inner surface 46 of the trailer body 22 to be smooth as indicated in FIG. 8A. Additionally, other implementations may find it desirable to have only one surface of trailer body 22 entirely smooth and the opposite surface may form a step-wise profile wherein one of the panel sections is thicker than the other panel sections. Even further, it is still possible for the center forward third panel section 52 to be thicker than first and second panel sections such that the butt joints form a step-wise profile along the outer surface 44 and the inner surface 46.

After the first portion 40 of trailer body 22 has moved through the rolling assembly 140 and given an arcuate profile as indicated in FIG. 14C, a similar process occurs with respect to the rear panel sections 54, 56, and 58 forming rear portion 42 of trailer body 22. The butt joint method identified herein above forms the third union 116 and the fourth union 118. After the rear portion 42 has been rolled in the rolling assembly 140 to be given an arcuate profile, the common trailing edge 90 of the forward portion 40 is mated with the common leading edge 120 of the rear portion 42. The trailing edge 90 and the leading edge 120 join together at a butt joint union 141. The butt joint 141 between forward portion 40 and rear portion 42 continues the flush and smooth surfaces along the trailer body when so desired. For example, when an embodiment of trailer body 22 depicted in FIG. 8 is formed, the outer surface 44 of trailer body 22 is flush and smooth across the butt joint union 141. Similarly, the inner surface 46 may be smooth and flush across inner portions of union 141.

Figure 7B:
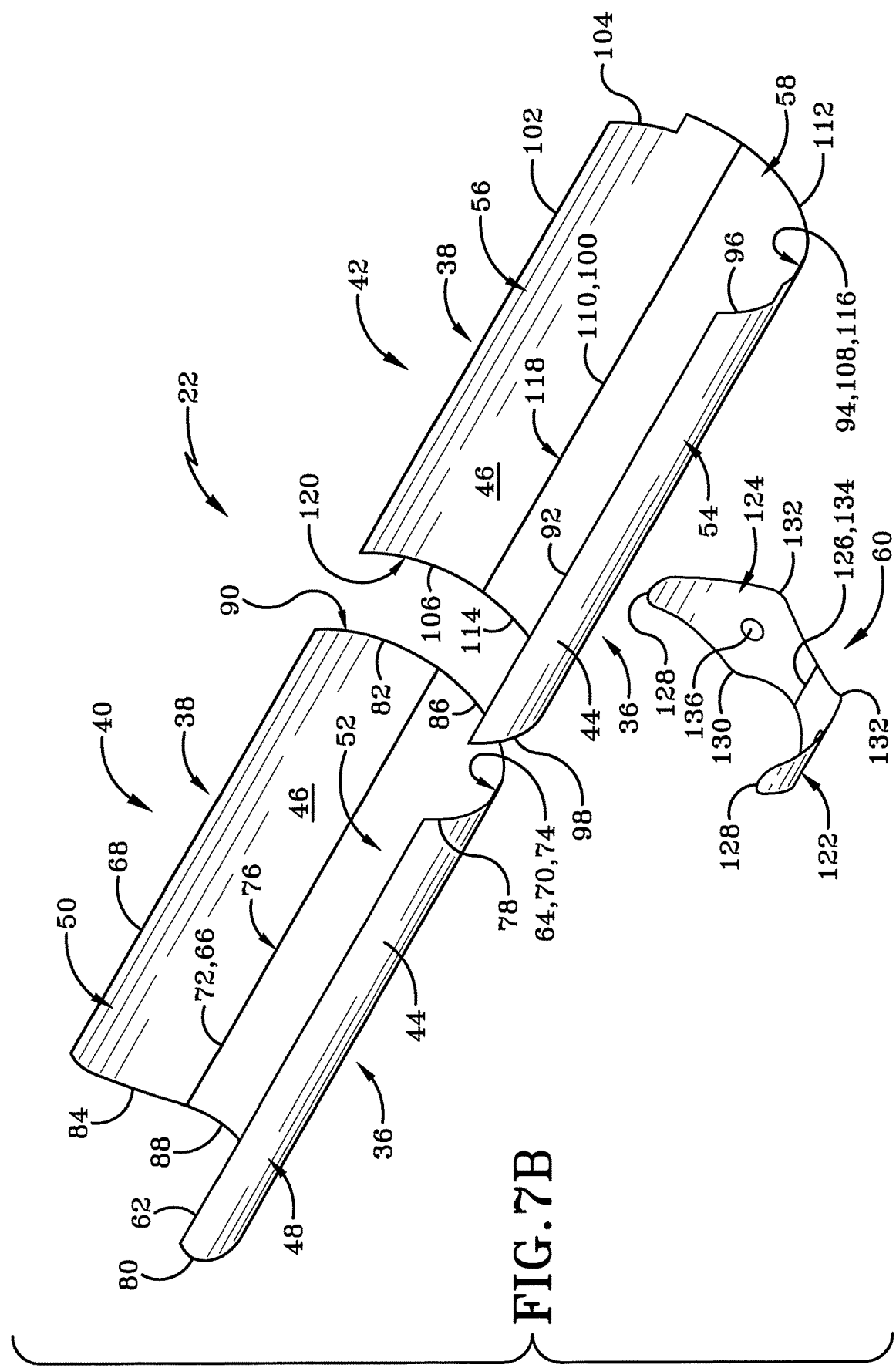
FIG. 7B is a perspective view of the trailer body of the first embodiment detailing the partially formed trailer body wherein the joined panels have been rolled in a rolling system as larger sheets to provide the arcuate profile of the trailer body.
Figure 7C:
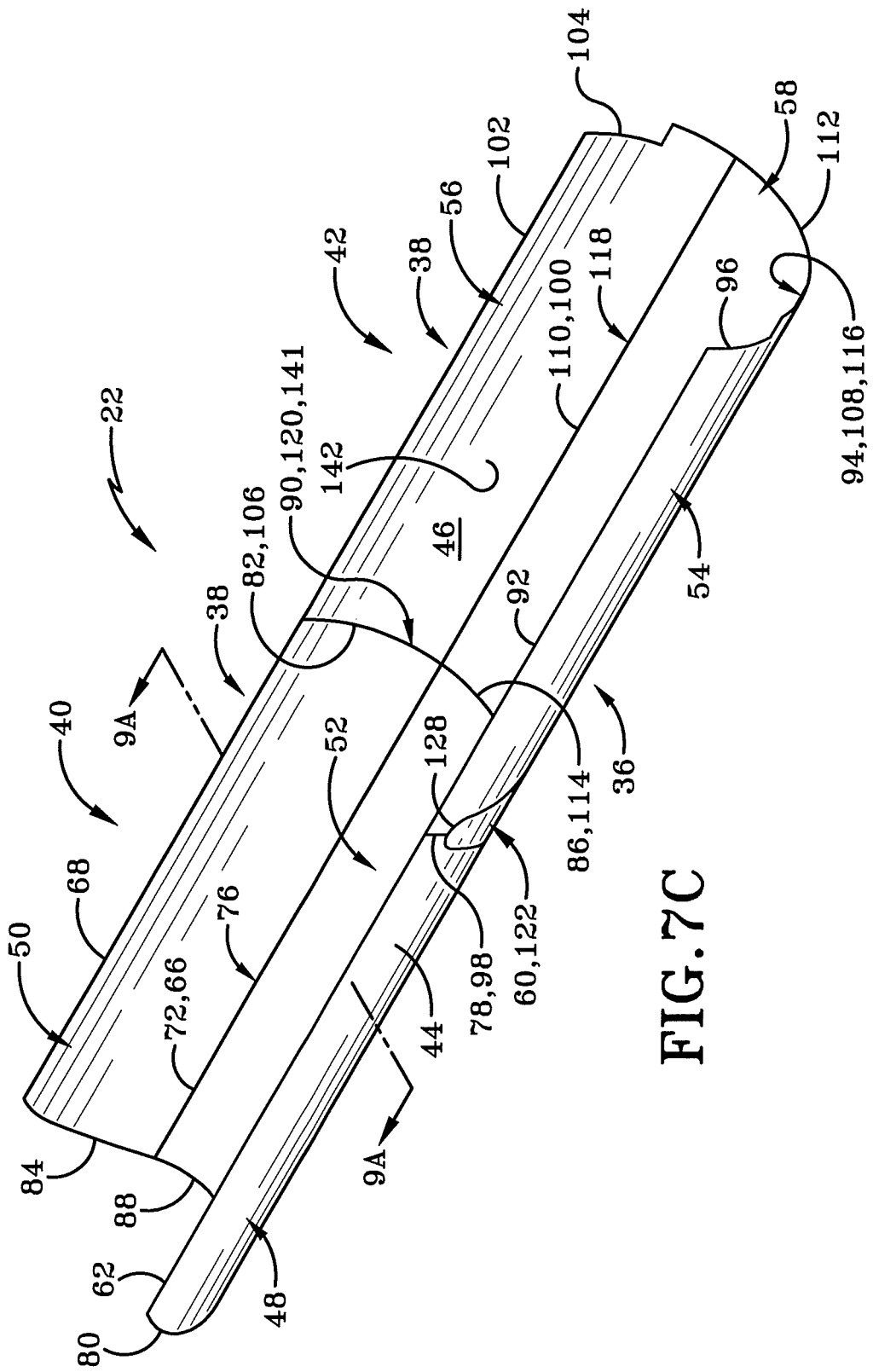
FIG. 7C is a perspective view of the trailer body of the first embodiment detailing the formed trailer body where a forward body portion is joined with a rear body portion.

Referring back to FIG. 7C, union 141 extends transversely substantially orthogonal to the first union 74, second union 76, third union 116, and the fourth union 118. In order to ensure the strength of the trailer body across transverse union 141, the protective brace members 60 may be rigidly secured to the outer surface 44 of trailer body 22 and span longitudinally across the union 141. It is worth noting that the protective brace member 60 may also be formed in a planar butt joint arrangement and then fed through rolling assembly 140 to impart a complimentary arcuate profile to the supportive brace members 60 having a radius of curvature similar to that of outer surface 44 on trailer body 22 (as shown in FIG. 7B).

As depicted in FIG. 9A, one embodiment of trailer body 22 is depicted with a uniformly arcuate concave inner surface 46 defining an interior containing volume 142 for receiving bulk materials therein. Because the concave inner surface 46 is uniform across the three forward panel sections 48, 50, and 52, the common radius of curvature R1 is associated with each of the forward panel sections. Stated otherwise, the radius of curvature R1 is the same for the forward first panel section 48, the forward second panel section 50, and the forward third panel section 52. The uniform radius of curvature across the three forward panel sections is accomplished as discussed herein above by forming the three panel sections with an abutting butt joint at the first union 74 and the second union 76 respectively.

Figure 9B:
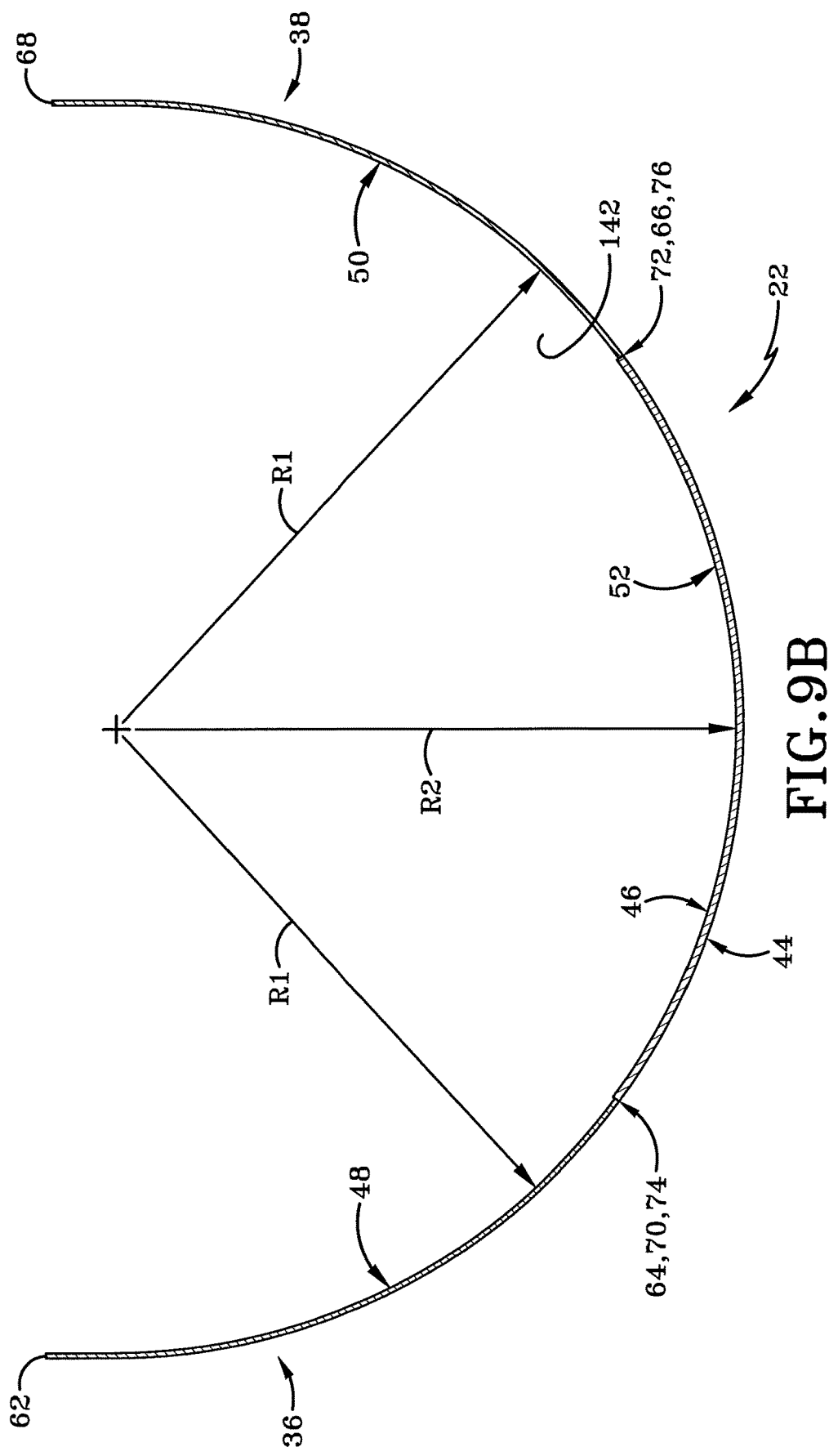
FIG. 9B is a cross section view similar to FIG. 9A depicting a non-uniform radius of curvature of the thicker panel depicted in FIG. 8B.

As depicted in FIG. 9B, one embodiment of the formed trailer body 22 may have a convex inner surface 46 that does not have a uniform radius of curvature. Namely, intermediate third panel section 52 is raised due to the greater thickness 138B as indicated in FIG. 8B. Accordingly, a second radius of curvature R2 is established that is less than the first radius of curvature R1. As such, a step-wise profile is generated which forms at the respective first and second unions 74, 76 where the intermediate third panel section 52 respectively connects to the first and second forward panel sections.

FIG. 9C depicts a scenario where the inner surface 46 of the trailer body 22 is uniform across the unions 74 and 76, but is not symmetrically uniform with respect to the curvature of the outer surface 44. The embodiment of the trailer depicted in FIG. 9C includes a third radius of curvature R3 associated with the outer surface that is less than a fourth radius of curvature R4. The greater thickness 138B of intermediate third panel section 52 establishes an outside step-wise profile of trailer body 22.

The trailer body 22 and the method of formation thereof as discussed hereinabove is not exclusive to the present disclosure. As depicted in FIG. 10 through FIG. 13, an alternative embodiment in accordance with the present disclosure depicts a trailer body generally at 200. Trailer body 200 comprises four panel sections that define the arcuate profile of trailer body 22 when manufactured and fully assembled.

Figure 10:
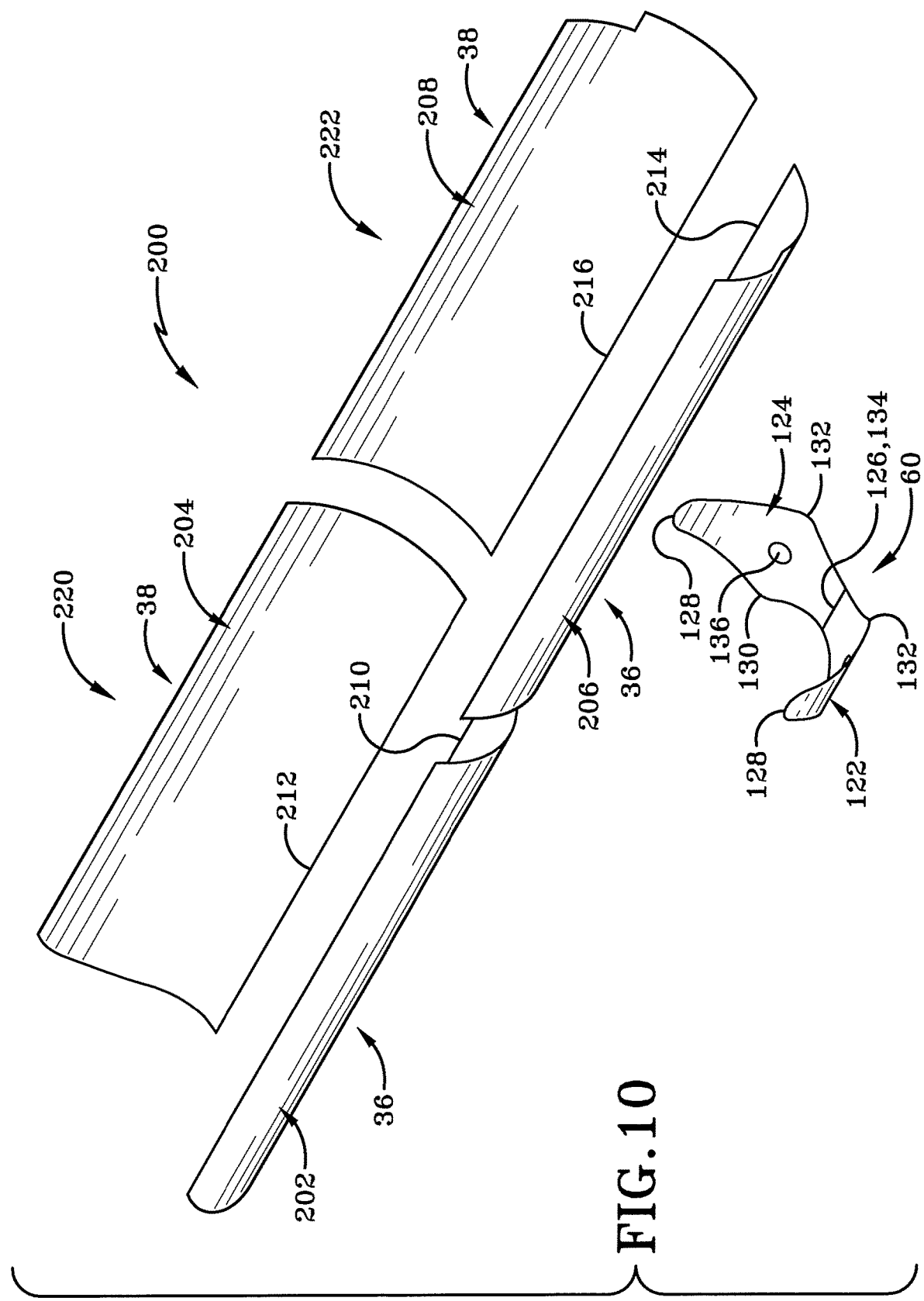
FIG. 10 is an exploded perspective view of a trailer body of a second embodiment detailing curved panels.

In one implementation, trailer body 200 may include a forward first panel section 202, a forward second panel section 204, a rear third panel section 206, and a rear fourth panel section 208. The trailer body 200 may further include a supportive brace member 60 similar to that depicted herein above. The exploded view in FIG. 10 depicts the generally arcuate profile of trailer body 200 formed from four arcuate panel sections having a longitudinally extending union at the bottom, or lowermost portion, of the trailer body 200 defining an interior containing volume 142.

As indicated in FIG. 11A, a longitudinally extending first medial edge 210 is located on the forward first panel section 202. A longitudinally extending second medial edge 212 is located on forward second panel section 204. A longitudinally extending third medial edge 214 is located on the rear third panel section 206. A longitudinally extending fourth medial edge 216 is located on the rear fourth panel section 208.

Figure 11B:
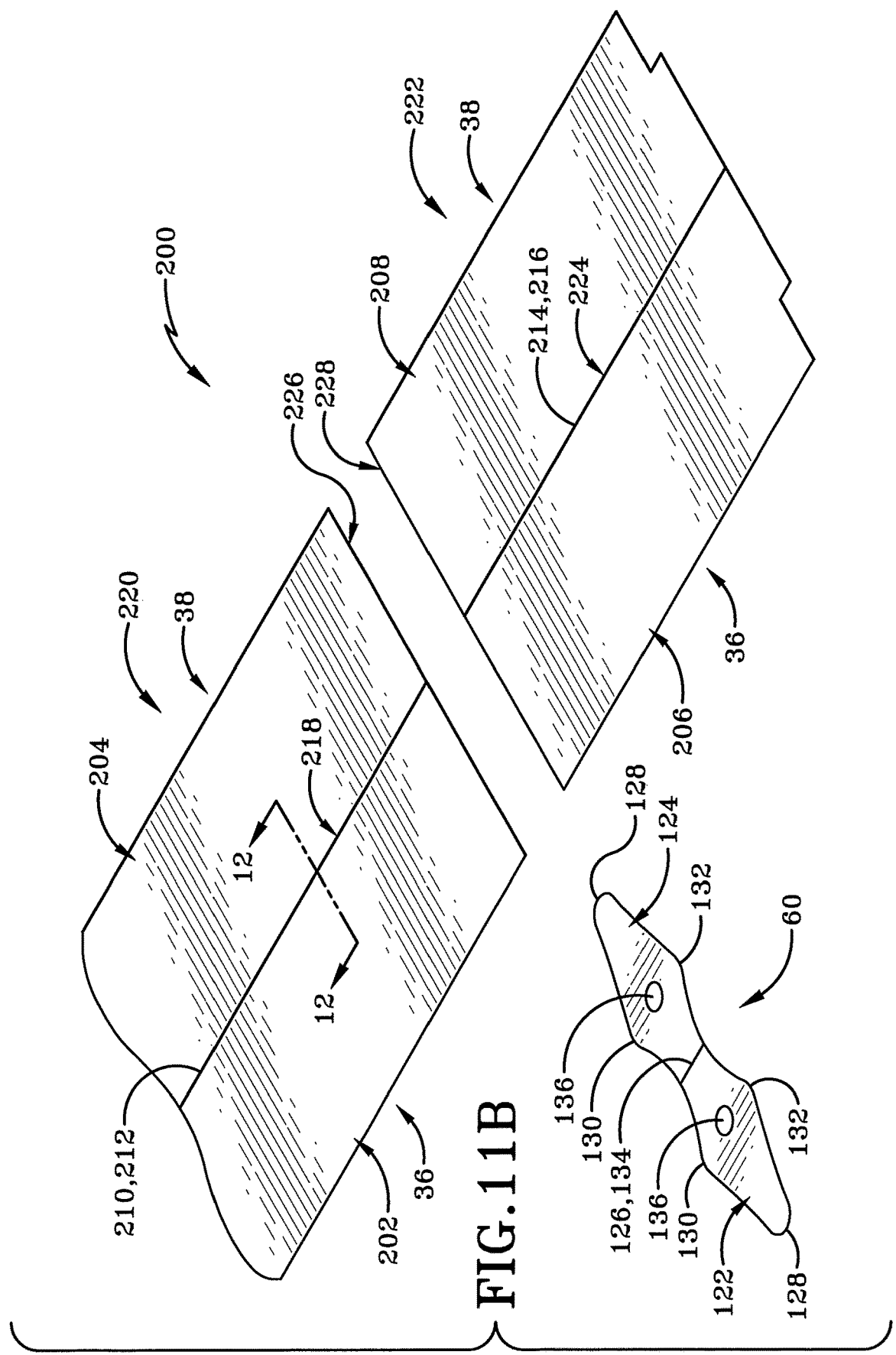
FIG. 11B is a perspective view of the trailer body of the second embodiment detailing the partially formed trailer body wherein the joined panels have been rolled in a rolling system as larger sheets to provide the arcuate profile of the trailer body.

As depicted in FIG. 11B, trailer body 200 is first formed by adjoining the first and second medial edges 210, 212 at a welded butt joint to form a longitudinally extending first union 218. First union 218 rigidly secures the forward first panel section 202 to the forward second panel section 204 to define a planar forward portion 220 of the trailer body 200.

Similarly, a rear portion 222 is formed when the rear third panel section 206 and the rear fourth panel section 208 are aligned at their respective third and fourth medial edges 214, 216 to define a second longitudinally extending union 224. On one particular embodiment, the first union 218 and the second union 224 are halfway between the first side 36 and the second side 38 of trailer body 200.

When the forward portion 220 is rigidly formed from the rigid connection of the first and second panel sections, a common trailing edge 226 is defined. Similarly, a complementary leading edge 228 is defined on the rear portion 222 when the third and fourth panel sections are rigidly secured together.

Prior to securing the forward portion 220 to the rear portion 222, each planar portion is rolled to give the trailer body 200 an arcuate profile. The manner in which the forward portion 220 and the rear portion 222 are rolled is similar to that discussed above with reference to FIG. 14A through FIG. 14C.

Figure 11C:
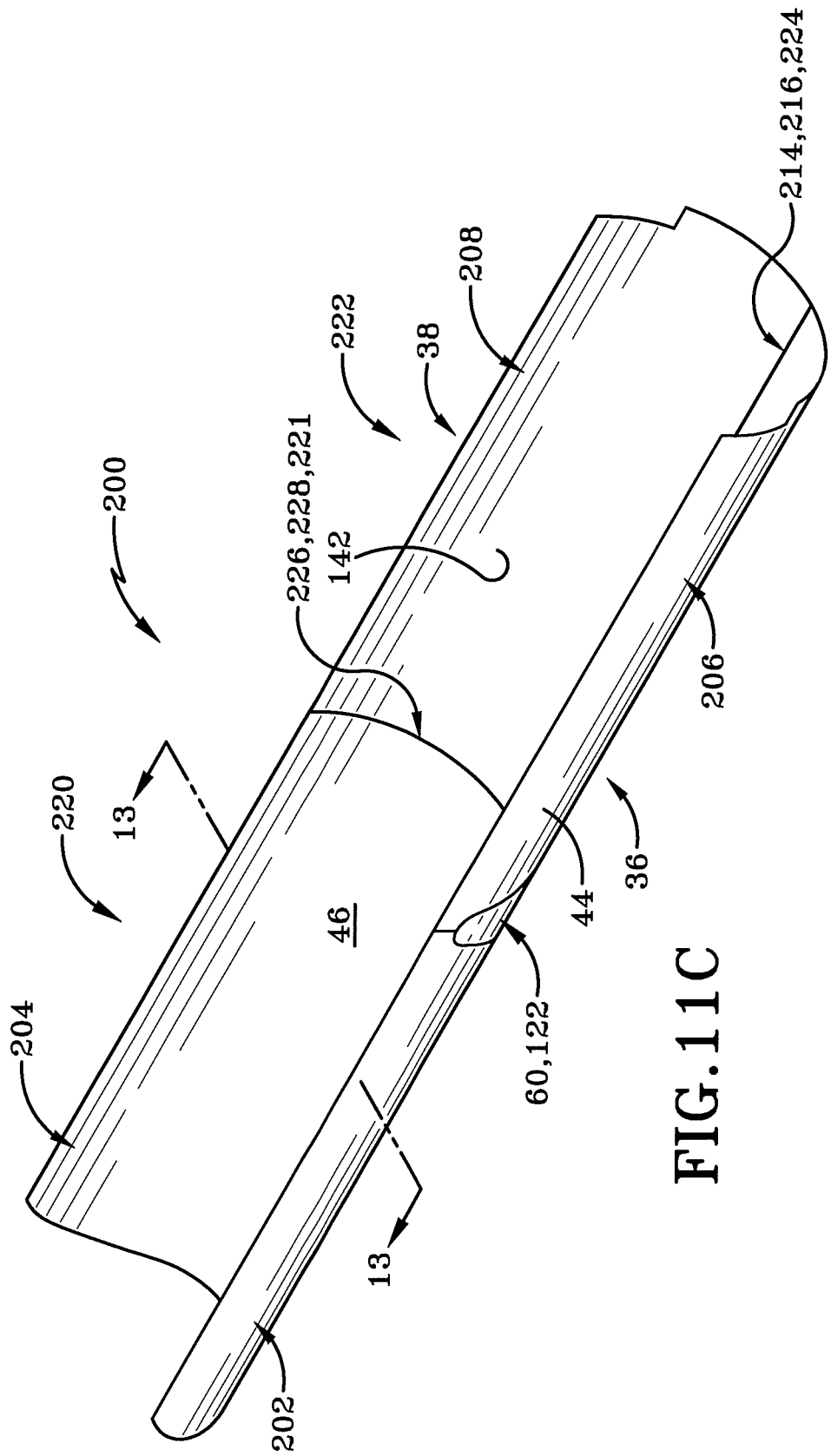
FIG. 11C is a perspective view of the trailer body of the second embodiment detailing the formed trailer body where a forward body portion is joined with a rear body portion.

Once the forward portion 220 and the rear portion 222 have been rolled, they may be abutted by aligning the common trailing edge 226 with the common leading edge 228 to create a transversely extending union 231 formed at a butt joint between the forward portion 220 and the rear portion 222. The supportive brace 60 may be welded to the exterior surface of the trailer body as indicated in FIG. 11C. The exterior supportive brace 60 longitudinally spans the transverse union 220 and transversely spans the longitudinally extending union 218, 224.

As indicated in FIG. 13, the first union 218 and the second union 224 may be located at the bottom, or lowermost portion, of trailer body 200. Similar to the previous embodiment described above, trailer body 200 may include a concave inner surface 46 opposite a convex outer surface 44 having a uniform radius of curvature R1.

As depicted in FIG. 12, trailer body 200 may also have a uniform thickness 138A similar to that of trailer body 22 identified in FIG. 8A through FIG. 8C. While not shown in FIG. 12, there may be plate formations that would have a tapered profile that can be thicker towards the center section or the medial longitudinally extending medial plane defined by union 218 to provide an increased strength to the bottom portion of trailer body 200 once the trailer has been rolled and formed into its arcuate profile.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A method of forming a frameless dump trailer comprising:
   providing a first planar panel and a second planar panel;
   abutting the first and second planar panels and aligning flushly at least one surface on the first and second planar panels;
   welding the first and second planar panels at a first butt weld to establish a larger planar first frameless trailer body portion;
   after welding the first and second planar panels together with the first butt weld, then rolling the larger planar first frameless trailer body portion, via a rolling assembly, to establish an arcuate first frameless trailer body portion; and
   connecting a supportive brace member to an outer surface of the arcuate first frameless trailer body portion such that the supportive brace member perpendicularly spans the first butt weld.

2. The method of claim 1, wherein prior to the step of rolling the larger planar first frameless trailer body portion further comprises:
   providing a third planar panel;
   abutting the third planar panel with the second planar panel; and
   welding the second and third planar panels at a second butt weld offset from the first butt weld, wherein at least one surface of the second and third planar panels is flush across the second butt weld.

3. The method of claim 1, wherein two surfaces of the first and second planar panels are flush across the first butt weld.

4. The method of claim 1, further comprising:
   forming a second frameless trailer body portion from aligned planar panels butt-welded together establishing a flush surface across the butt welds to establish a planar second frameless trailer body portion;
   joining the first frameless trailer body portion with the second frameless trailer body portion at a transverse butt weld orthogonal to the first butt weld.

5. The method of claim 4, further comprising:
aligning a trailing edge on the first panel with a trailing edge on the second panel to establish a collective trailing edge for the planar first frameless trailer body portion.

6. The method of claim 5, further comprising:
aligning leading edges on the panels forming the second frameless trailer body portion to establish a collective leading edge;
abutting the collective trailing edge with the collective leading edge.

7. The method of claim 6, further comprising:
joining the collective trailing edge and the collective leading edge with a transversely aligned butt weld;
wherein at least one surface on the first trailer body portion is flush with the second trailer body portion across the transversely aligned butt weld.

8. The method of claim 7, further comprising:
connecting a support member beneath the transversely aligned butt weld.

9. The method of claim 8, wherein the support member is formed from the steps of:
abutting a first support member portion with a second support member portion along a longitudinally extending support member union; and
welding the support member union with a butt weld.

10. The method of claim 9, further comprising the steps of:
rolling the support member to establish an arcuate profile complementary to that of an outer surface on one of the panels on the first and second frameless trailer body portions.

11. The method of claim 1, wherein a surface corresponding to an inner surface of the formed arcuate first frameless trailer body portion is flush across the butt weld.

12. The method of claim 1, wherein a surface corresponding to an outer surface of the formed arcuate first frameless trailer body portion is flush across the butt weld.

13. The method of claim 1, further comprising:
abutting, directly, the first and second planar panels; and
defining an entirely flat surface between a first longitudinal edge on the first planar panel and a second longitudinal edge on the second planar panel.

14. The method of claim 1, further comprising:
feeding the larger planar first frameless trailer body portion transversely through the rolling assembly;
wherein a surface of the larger planar first frameless trailer body portion is entirely smooth between a first longitudinal edge on the first planar panel and a second longitudinal edge on the second planar panel.

* * * * *